United States Patent

Nichols, Jr.

[15] 3,640,760
[45] Feb. 8, 1972

[54] COATED SCREENS
[72] Inventor: George E. Nichols, Jr., Norfolk, Mass.
[73] Assignee: Bird Machine Company, South Walpole, Mass.
[22] Filed: Dec. 18, 1970
[21] Appl. No.: 99,535

Related U.S. Application Data

[63] Continuation-in-part of Ser. No. 873,334, Nov. 3, 1969, abandoned.

[52] U.S. Cl. ...........................117/99, 117/130 R, 210/499, 139/425 A, 245/1
[51] Int. Cl. .........................................B44d 5/08, B44d 5/00
[58] Field of Search ...................210/499; 139/425 A; 245/1; 162/DIG. 1; 117/99, 98; 209/395

[56] References Cited

UNITED STATES PATENTS

| 2,162,808 | 6/1939 | Gallup | 117/99 X |
| 3,425,900 | 2/1969 | Purdy | 117/99 X |

Primary Examiner—Ralph S. Kendall
Assistant Examiner—Edward G. Whitby
Attorney—Edgar H. Kent

[57] ABSTRACT

Hard-surfacing a screen with a detonation-deposited coating of bonded refractory particles adhered to the surface of the screen and to one another, the coating overlying substantially only the imperforate area of the screen surface, and having a Vickers Hardness of at least 1,000 VPN (with a 300 gm. load) and a thickness at least on the order of 0.003 inch.

4 Claims, 4 Drawing Figures

PATENTED FEB 8 1972  3,640,760

COATED SCREENS

This application is a continuation-in-part of my pending U.S. application Ser. No. 873,334 filed Nov. 3, 1969, now abandoned.

This invention relates to heavy duty screens employed in high-capacity industrial separators, centrifuges, refiners, and the like.

Industrial screens, such as those used in the "screen bowl centrifuges" described in U.S. Pat. No. 3,348,767, in the "oscillating centrifuges" described in U.S. Pat. No. 3,133,879, and in screening apparatus such as described in U.S. Pat. No. 3,363,759, have limited useful lives because of continual exposure at high rotational or oscillating speeds to rapidly flowing particulate matter, which is often also abrasive and corrosive. Coating such screens, to prolong their useful lives and also avoid costly equipment shutdowns, by conventional spraying (up to 600 f.p.s.) of refractory materials of requisite hardness and corrosion resistance has proved unsatisfactory because of the inability to achieve an operatively thick coating of an economical protective material without plugging or "-bridging" the perforations. Moreover, such coatings as have been achieved have often been brittle and poorly adherent under the operational flow conditions.

It is an object of this invention to provide a durable, corrosion resistant, adherent coating for a surface of a screen which is substantially flat between perforations, the coating overlying substantially all and only the areas between perforations of the screen.

The invention features a screen having a perforate main body portion and, on at least one surface thereof which is substantially flat between the perforations, a long-wearing detonation-deposited coating of bonded refractory particles adhered to this surface and to one another, the coating overlying substantially all and only the imperforate areas of the body portion, and having a Vickers Hardness of at least 1,000 VPN and a thickness at least on the order of 0.003 in.

A preferred process for applying this coating utilizes a method and apparatus such as described, e.g., in U.S. Pat. Nos. 2,714,563 and 2,964,420. This process comprises providing a detonatable mixture of a fuel gas and an oxidizing gas, and refractory particles unconsumable by the detonation, igniting the detonatable gaseous mixture to produce a detonation, and transmitting at least some of the detonation energy to the powdered refractory material to direct that material, at the high velocity induced by detonation, at the screen surface in a direction substantially perpendicular thereto.

Preferably, detonations are produced in an elongated barrel, having an open end and its axis substantially perpendicular to the screen surface to be coated, by repeatedly igniting a charge of detonatable mixture introduced into the barrel. Powdered refractory material is repeatedly introduced to the barrel downstream of the ignition, thereby to be ejected repeatedly from the barrel by the repeated detonations onto the screen surface until the required coating depth is achieved. Acetylene and oxygen, in proper proportions, may be used to provide a detonatable mixture, and a preferred refractory material is a tungsten carbide composition containing about 9 percent cobalt binder. Utilizing this preferred material screens have been hard-surfaced to an extent such as to increase their abrasion-wear lifetimes, greatly over chrome-plated screens, which, in turn, are three to four times as wear resistant as uncoated screens, and yet are with no bridging of openings as fine as 0.012-inch width slots.

Other objects, features, and advantages will appear from the following description of a preferred embodiment of the present invention, taken together with the attached drawings thereof, in which.

Figure 1:
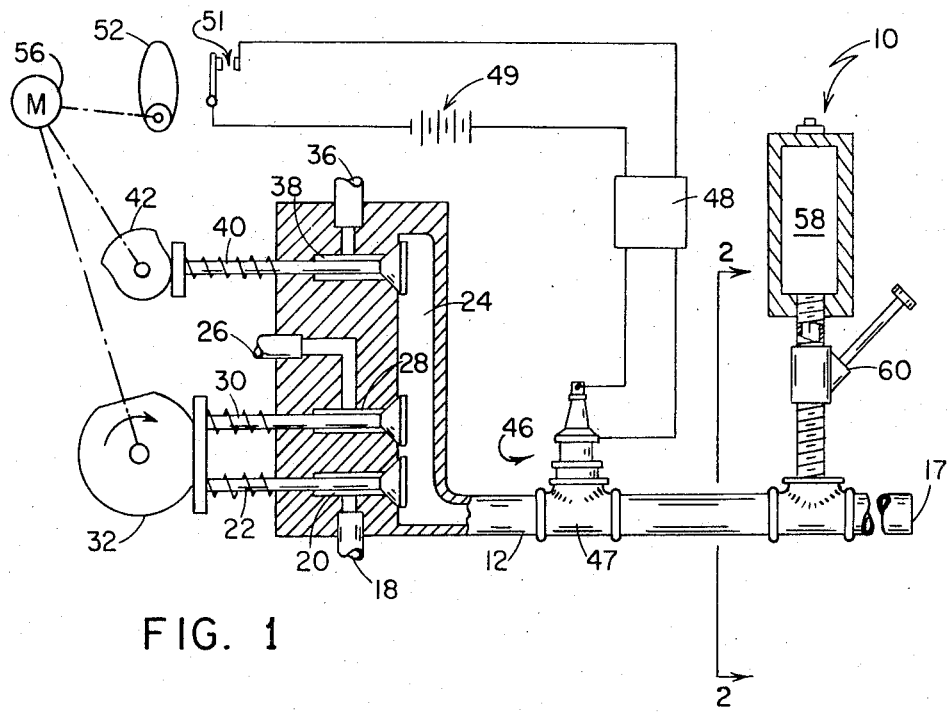
FIG. 1 is a schematic view of apparatus useful in carrying out the process of the present invention.
Figure 2:
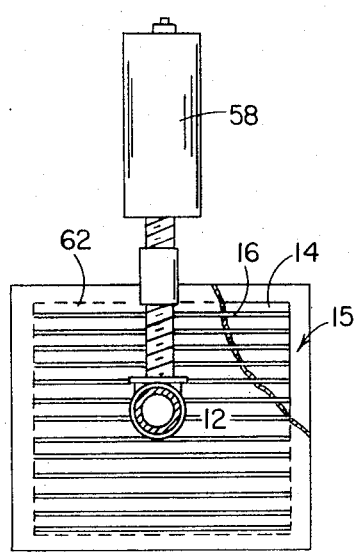
FIG. 2 is a sectional view of FIG. 1, along line 2—2 thereof, showing a preferred orientation of a screen for coating in accordance with the present invention.

FIGS. 1 and 2 show detonation-coating apparatus 10 having an elongated barrel 12, arranged perpendicular to the perforate surface 14 of a screen 15, having a plurality of elongated narrow (e.g., 0.012-inch slots 16. Barrel 12 has an open end 17. Oxidizing gas is supplied from inlet 18 to chamber 20 and, in bursts controlled by poppet valve 22, to mixing cavity 24, whereas fuel gas is supplied from inlet 26 to chamber 28 and, in bursts controlled by poppet valve 30, to mixing cavity 24, valves 22, 30 being operated in unison by cam 32. Purging gas is supplied from inlet 36 to chamber 38, and, in bursts controlled by poppet valve 40 and cam 42, to mixing cavity 24. A spark plug 46, communicating with ignition chamber 47 of barrel 12, is fired by spark coil 48, battery 49, and switch 51, operated by cam 52. A single motor 56 may be utilized to drive all three cams 32, 42, 52. Refractory powder is supplied from reservoir 58 at a rate controlled by an appropriate valve 60, and adheres to imperforate portions only of the perforated surface 14 as a hard coating 62.

In operation, cam 32 rotates to open poppet valves 22, 30 to admit charges of oxidizing gas and fuel gas (e.g., 1 part oxygen to 1-2 parts acetylene by volume) to chamber 24, then further rotates to close these poppet valves. Immediately after valves 22 and 30 close, cam 42 opens valve 40 to admit inert purging gas (e.g., nitrogen) to chamber 24, which dilutes the gases remaining around valves 22, 30 to prevent flashback into these valves upon detonation. As soon as valve 40 is opened, cam 52 closes switch 51, thereby firing spark plug 15 to ignite the detonatable gaseous mixture in ignition chamber 47, producing a detonation. Valve 40 remains open to permit purging gas to follow the detonation combustion products out of the barrel, and then closes to permit the cycle to begin again. Powder may be introduced continuously in a slow stream or in bursts timed to coincide with detonation, such that powder particles are projected from the open end of the barrel, under acceleration of the detonation, at the perforate surface, to form thereon a detonation-deposited coating 62. A preferred practice of the process, for hard-coating, for example, a screen having 0.012 inch wide slots, utilizes finely powdered (10-40 microns, for the most part) particles of a cast composition including tungsten carbide and 9 percent cobalt binder, produced by Union Carbide Corp. under the designation "LW-1 (AMS 2435)"; a total flow of a detonatable 1:1 oxygen-acetylene mixture of 360 cu.ft./hr. ignited four times per second in a barrel about 5 ft. long and 1 inch in diameter; and a purging nitrogen gas flow of 180 cu.ft./hr. The screen surface is maintained about 3 inch from the open end of the barrel substantially perpendicular to the direction of flow until the desired depth of coating (e.g., 0.005 inch) is produced, having a cross-sectional Vickers Hardness of the order of 1,300 VPN (with a 300 g. load). The screen surface is, as shown, substantially flat between the slots (i.e., is planar or curved on a large radius) so that the perpendicular relationship to the direction of flow may be provided.

A preferred detonatable mixture utilizes oxygen as oxidizing gas and acetylene as fuel gas, the acetylene being 3.5 percent to 93 percent of the mixture by volume. Acetylene-air, hydrogen-air, propane-oxygen, and hydrogen-oxygen also can be combined into detonatable mixtures. The frequency of detonation depends on the diameter and length of the barrel, as well as the cooling system (usually air) utilized. A preferred purging gas is nitrogen.

A preferred powdery refractory material is a tungsten-carbide composition containing, in addition to tungsten carbide, about 9 percent cobalt binder. Somewhat less wear resistant is a tungsten carbide-chromium carbide-nickel composition containing about 5 percent nickel, 25 percent tungsten carbide, and the remainder mixed tungsten-chromium carbides, produced by Union Carbide Corp. under the designation "LW-5." The resultant coating should be at least in the order of 0.003-inch thick, and should have a cross-sectional Vickers Hardness at least 1,000 (with a 300 g. load).

Figure 4:
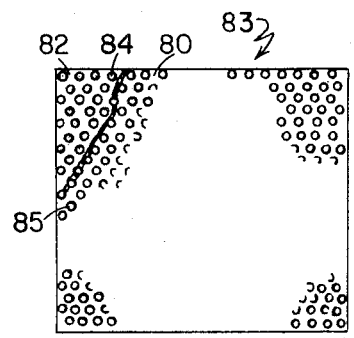
FIGS. 3 and 4 are sectional and elevational views, respectively, of other representative screens coated in accordance with the present invention.
Figure 3:
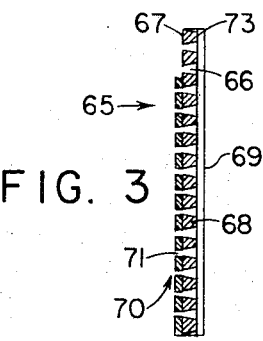

Exemplary screens which may be coated in accordance with the present invention are shown in FIGS. 3 and 4. In FIG. 3, a triangular-shaped wire screen 65, formed of elongated apertures 66 of increasing width between screening surface 67 and opposite surface 73, the apertures being between elongated wires 68 held together by spaced supports 69, has an overlying detonation-deposited coating 70, having apertures 71 substantially of width equal to the width of screen apertures 66 at flat screening surface 67. In FIG. 4, a portion of a detonation-deposited coating 80 on the screening surface 82 of a perforated screen 83 is broken away to reveal the substantially equal widths of the apertures 84 through screen 83 and the apertures 85 through coating 80.

Other embodiments will occur to those skilled in the art and are within the following claims.

What is claimed is:

1. A screen having a perforate main body portion and, on at least one surface thereof which is substantially flat between the perforations, a long-wearing detonation-deposited coating of bonded refractory particles adhered to said surface and to one another, said coating overlying substantially all and only the areas between perforations of said body portion, and having a Vickers Hardness of at least 1,000 VPN (with a 300 g. load) and a thickness at least on the order of 0.003 inch.

2. The screen of claim 1 wherein said refractory particles are of a cast composition comprising tungsten carbide and a cobalt binder.

3. The screen of claim 1 wherein said main body portion has a plurality of equally spaced parallel elongated apertures.

4. The screen of claim 1 wherein said body portion has a screening surface on one side having smaller apertures than those in the opposite surface, said apertures increasing in size between said screen surface and said opposite surface, and said detonation-deposited coating is adhered to said screening surface only.

* * * * *

UNITED STATES PATENT OFFICE
CERTIFICATE OF CORRECTION

Patent No. 3,640,760            Dated February 8, 1972

Inventor(s) George E. Nichols, Jr.

It is certified that error appears in the above-identified patent and that said Letters Patent are hereby corrected as shown below:

Col. 2, line 4, after "inch", insert --)--.

Col. 2, line 51, add --m-- after the "g".

Col. 2, line 72, add --m-- after the "g".

Col. 4, line 3, add --m-- after the "g".

Signed and sealed this 20th day of June 1972.

(SEAL)
Attest:

EDWARD M. FLETCHER, JR.
Attesting Officer

ROBERT GOTTSCHALK
Commissioner of Patents